Jan. 20, 1970  G. K. C. HARDESTY  3,491,245

GUIDED LIGHT DISPLAY PANEL

Filed April 10, 1967  4 Sheets-Sheet 1

INVENTOR
G. K. C. HARDESTY

BY  D.L. Hodges
ATTORNEY

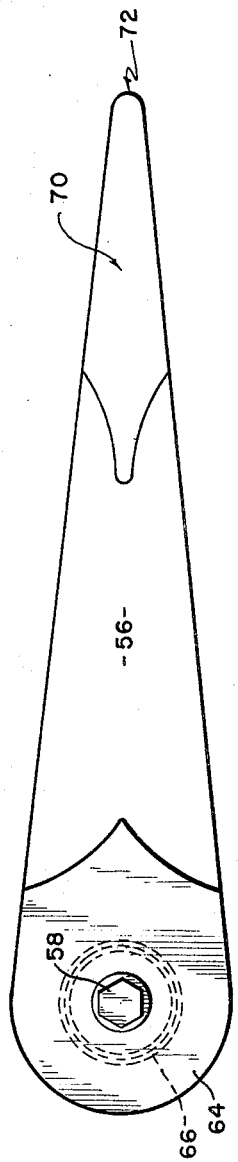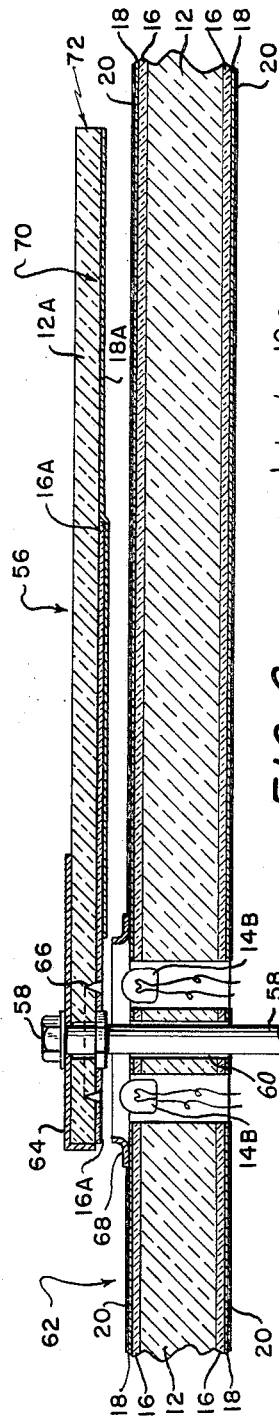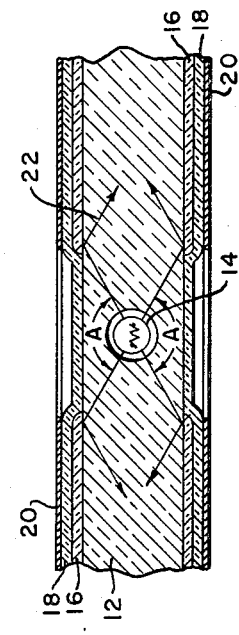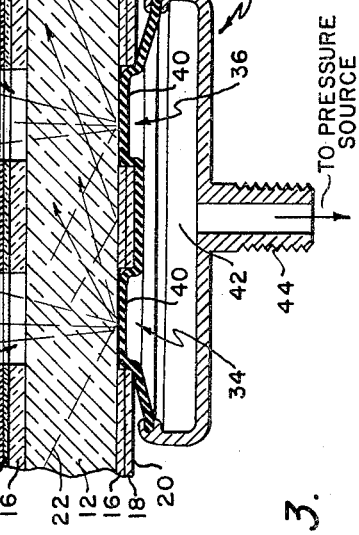

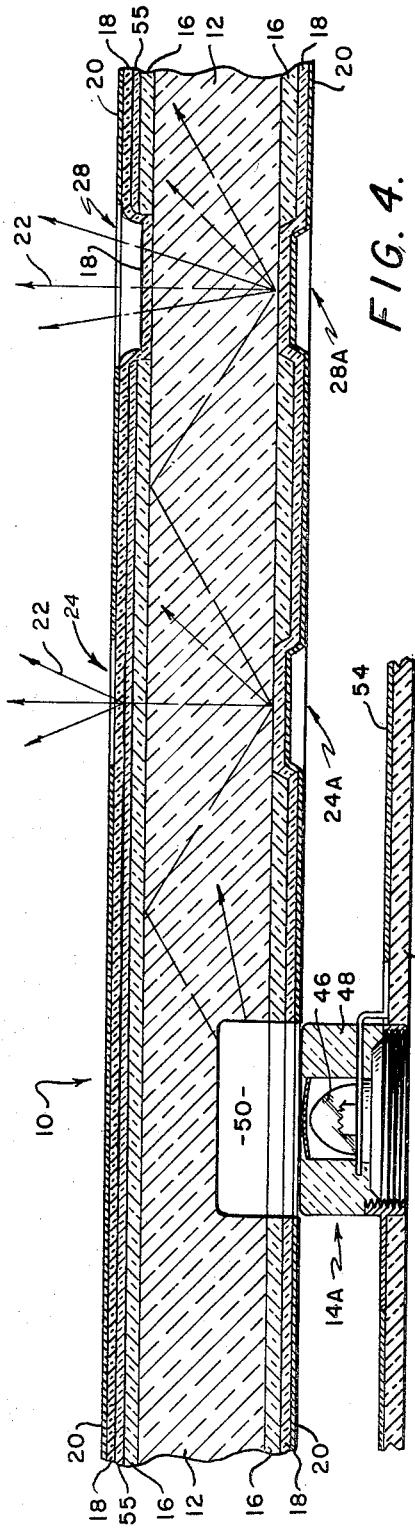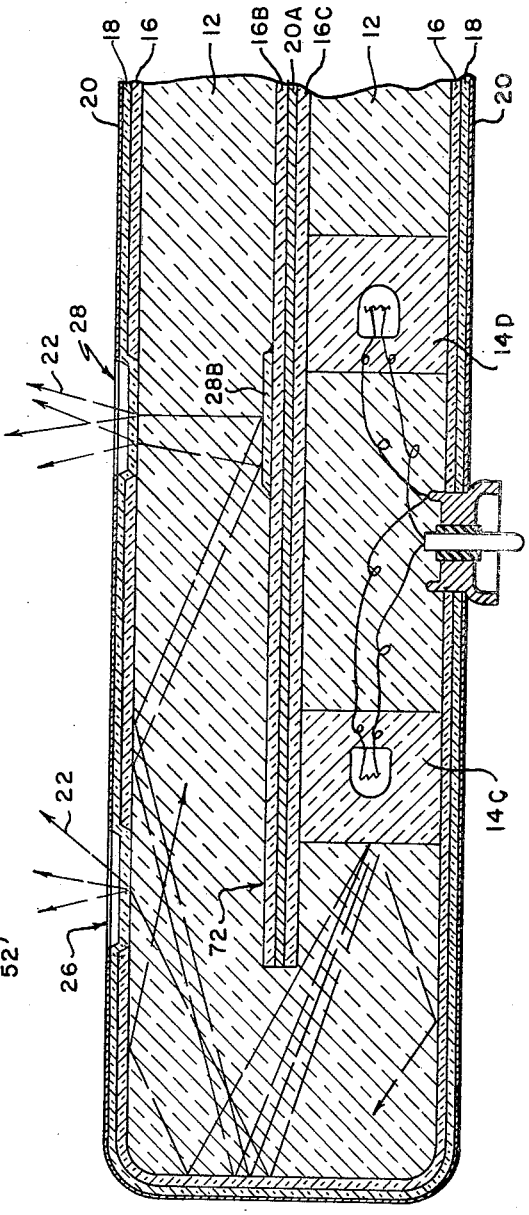

United States Patent Office 3,491,245
Patented Jan. 20, 1970

3,491,245
GUIDED LIGHT DISPLAY PANEL
George K. C. Hardesty, Box 156, Mayo, Md. 21106
Filed Apr. 10, 1967, Ser. No. 629,822
Int. Cl. G02b 5/14
U.S. Cl. 250—227
24 Claims

ABSTRACT OF THE DISCLOSURE

Means for increasing the efficiency of utilization and the throw of light from a source in edge-lighted, opaque-faced, plastic panels and the like and effecting more uniformity of illumination of the indicia in such devices through the use of selected transparent isolating layer coatings on the main body portion of the edge-lighted panel having a lower index of refraction from said main body portion which effect true "total internal reflection" of internal light within a given range of incident angles. Further, selected alteration or modification of such coatings provides for selective illumination of the various indicia on the said panels.

---

The invention described herein may be manufactured and used by or for the Government of the United States of America for governmental purposes without the payment of any royalties thereon or therefor.

This invention relates to display panels and other readout means and more particularly to internally illuminated display panels and readout means incorporating new and novel internal light utilization techniques and structures effecting same. The invention is particularly applicable to opaque-faced, "edge-lighted," plastic panels as well as to dials, pointers and other readout or display structures of measuring instruments and the like which require selective illumination or specific guiding of the internal illumination.

In providing illuminated display panels and other internally illuminated devices of the edge-lighted type, simplicity of structure, efficiency of light utilization, power levels of energization, uniformity of illumination of indicia and the like and the space consumed by such devices are interrelated parameters which have not been collectively optimized in prior art devices.

For example, a single panel device using a single light conducting basic layer to illuminate translucent indicia in an otherwise opaque surface integrated therewith might optimize the parameters of structural simplicity and space consumed, but falls far short of optimizing power levels, efficiency of light utilization and uniformity of illumination.

Because of the highly desirable attributes of structural simplicity and optimally minimum space requirements of the single panel type of device, there is a substantial demand for same.

On the other hand, panel devices of the duo-panel type, which require a basic panel structure comprising a light conducting panel separated from an indicia carrying panel by a relatively small air space, have been considered as optimizing the parameters of light throw (i.e., efficiency of light utilization), power levels and uniformity of illumination. These duo-panel devices, however, have not optimized the parameters of space consumed and structural simplicity.

It is, therefore, an object of this invention to provide single-panel display devices and light guiding means which collectively provide the advantages of structural simplicity, minimized space consumption, minimized power levels, maximized efficiency of light utilization through the provision of true "total internal reflection," and optimized uniformity of illumination.

It is another object of this invention to provide internally illuminated single-panel display devices and light guiding means incorporating new and novel coating structures or formats which effect increased efficiency of internal reflection of illumination and selective transmittance of internal illumination to the exterior thereof.

Still another object of this invention is to provide internally illuminated single-panel display devices and light guiding means incorporating new and novel coating structures or formats which effect increased efficiency of internal reflections of illumination and selective transmittance of internal illumination to the exterior thereof, wherein a transparent isolating layer coating is selectively applied to a transparent light conducting sheet of panel material, said isolating layer coating effecting true "total internal reflection" of light impinged thereon over a substantial range of incident angles.

Yet another object of this invention is to provide internally illuminated display panels and the like comprising a transparent plastic core, a selectively applied transparent isolating layer coating on said core effecting true "total internal reflection" of light impinged thereon over a substantial range of incident angles, selectively applied translucent coating means on said core and selectively applied opaque layer means on said core, said isolating layer, said translucent coating means and said opaque coating means being selectively oriented with respect to one another to effect selectively variable transmittance and reflection of the internal illumination in the said display panels and the like.

These and other objects of the present invention will become more readily apparent with reference to the following specification and drawings which relate to several preferred embodiments thereof.

In the drawings:
FIGURE 1 is a top plan schematic of a single-panel display means of the present invention;
FIGURE 2A is an enlarged partial schematic in cross-section of an internal light conserving feature of the present invention;
FIGURE 2B is a side elevation, in cross-section, of a single panel display structure viewed along the section line 2B—2B of the schematic of FIGURE 1;
FIGURE 3 is an enlarged partial cross-section of an alternate embodiment of an internal illumination modifying means in a panel structure similar to that shown in FIGURE 2B;
FIGURE 4 is a partial cross-section of another embodiment of a display panel means of the type shown in FIGURES 1 and 2B;
FIGURE 5 is a top plan view of an instrument pointer structure incorporating another embodiment of the invention;
FIGURE 6 is a side elevation, in cross-section, of the pointer structure of FIGURE 5 mounted in an instrument panel or the like;
FIGURE 7 is a partial cross-section of still another embodiment of display means of the present invention;

At this point, it will be useful to define a conventional, prior-art, single-panel structure. These structures generally comprise a transparent plastic core covered with translucent white paint, which in turn is covered with black paint except for legends, graduations and other illuminable indicia. The transparent plastic core is edge-lighted and the panel functions on the basis of repeated diffuse reflection of part of the internal light by the transluscent coatings on the plastic core.

In general, the core is only a transparent support for the functional diffuse coatings and conveys light flux internally.

The decrement of available light flux in such a panel structure is very high, partially because so much light is lost through the translucent interfaces. Further, when core thickness is sufficient for practical display area applications, the geometry available for light distribution is highly inefficient, even if substantially optimum characteristics are selected for the diffuse coatings.

The basic structure of the several embodiments of the guided-light means of the present invention, excluding for the moment the various means for modifying the transmittance and reflection of the internal illumination imparted thereto, comprises a transparent core, a transparent isolating layer coating on said core and a translucent layer coating on said isolating layer. An opaque layer coating may be applied over said translucent layer as required.

With the general structural components of the present invention now defined, detailed reference is now made to the drawings.

Figure 1:
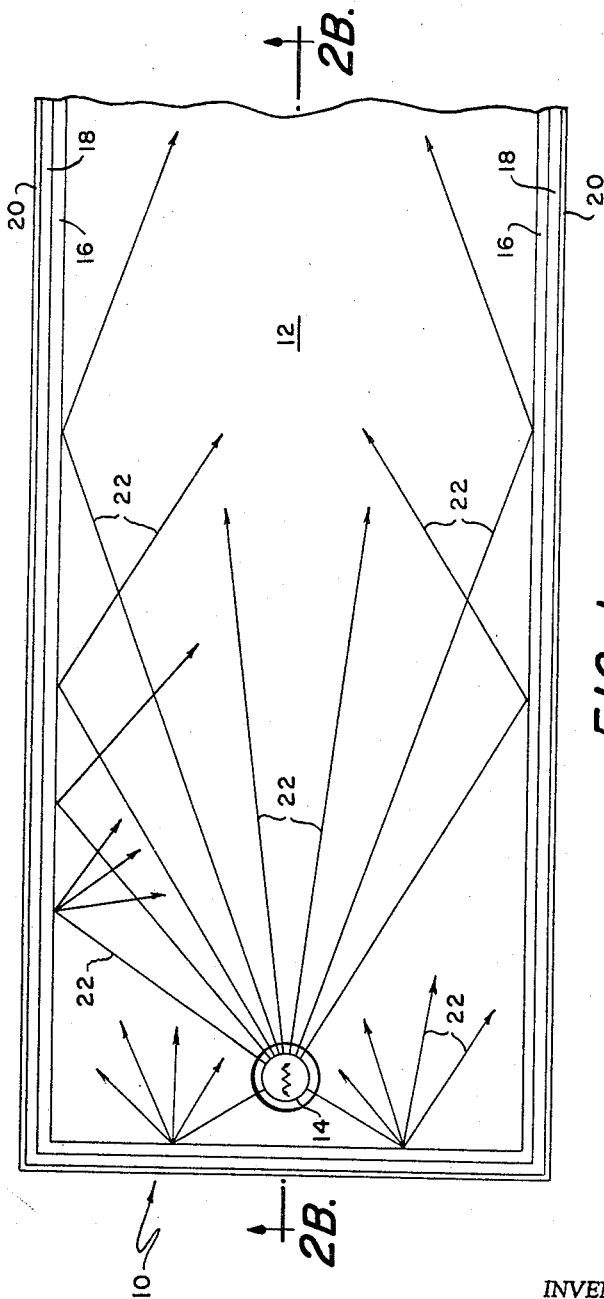

Referring to FIGURE 1, a light guide display panel 10 of the present invention is shown in schematic form as generally comprising a transparent plastic core or base 12 having a light source 14 internally disposed therein, a first lamination consisting of a transparent isolating coating 16 on said core 12, a second lamination consisting of a translucent white coating 18 on said isolating coating 16 and a third lamination consisting of a black or gray opaque coating 20 on said translucent white coating 18.

A plurality of "light rays" 22 are shown emanating from the source 14 through the core 12, impinging on the isolating coating 16 and reflecting from the latter back into the core 12. The throw of any given "light ray" 22 through the core 12 for any given reflection thereof is readily shown as being a function of the incident angle on the isolating coating 16.

For the sake of ilustration, the core 12 is assumed to have an index of refraction of 1.47 and the transparent isolating coating is assumed to have an index of refraction of 1.37.

With these particular indices of refraction, all of the light rays 22 emanating from the source 14 and striking the interfaces between the core 12 and the transparent isolating coating 16 at angles of incidence of sixty-five degrees (65°) or more, are totally internally reflected, repeatedly, and with virtually no loss of light energy. Light from the source 14 which strikes the interface of the core 12 and isolating coating 16 at lesser angles of incidence will be transmitted through the isolating coating 16, diffusely reflected by the translucent layer 18 into the core 12. Thus, the edges of the panel 10 immediately behind the point source 14 will be illuminated and act as a virtual source to project light throughout the core 12 and thereby increase the available light energy therein.

Referring now to FIGURE 2A, it can readily be seen that light emanations 22 from the source 14 (treated as a point source) defines a cone of light having a "loss angle" A subtended at its apex of twice the critical angle of incidence, the latter, by definition, being taken from the normal to the interface of the core 12 and the transparent isolating coating 16. Therefore, at the interface of the core 12 and the various coatings, a circular projection of light is effected which will pass through the interface and introduce losses to the system.

To overcome this effect, the translucent white coating 18 is permitted to make contact with the core 12 and, consequently, the transparent isolating coating 16 is removed over the area of the projected circle. There is now a diffuse interface between the core 12 and the translucent coating 18 which effects diffuse reflection of the light within the loss angle A back into the core. Because of the diffuse effect, there is a substantial percentage of light reflected back into the core 12 at proper incident angles for continued total internal reflection at the interface of the isolating layer 16 and the core 12.

This corrective feature to prevent light loss can be applied to all those interfaces of the core 12 which the geometry of the source 14 and core 12 may require, i.e., any interface where a projection of light from the source 14 of less than the critical angle of incidence occurs. However, when multiple sources are utilized within the same guided light panel, this corrective feature is applied only on the obverse and rear surfaces of the core 12 adjacent each source, the edge faces of the core 12 being unaltered from the above-described multiple-coating state.

For all incident angles greater than the given critical angle the isolating coating 16 effects total internal reflection of illumination in the core 12.

In generalizing the specific example of FIGURE 1, wherein the core 12 has an index of refraction of 1.49 and the transparent isolating coating 16 has an index of refraction of 1.37, the following criteria must be observed for the transparent isolating coating 16.

(1) The isolating coating 16 must be transparent.

(2) The isolating coating 16 must have an index of refraction which is less than that of the core 12.

(3) The isolating coating 16 must be of a thickness greater than one wavelength and preferably on the order of three (3) wavelengths of light or greater when applied to the core 12.

Therefore, critical thickness control is obviated, the only thickness requirement for the isolating coating 16 being that it must exceed a minimum value. Accordingly, spraying or dipping techniques of application are satisfactory.

Figure 2B:
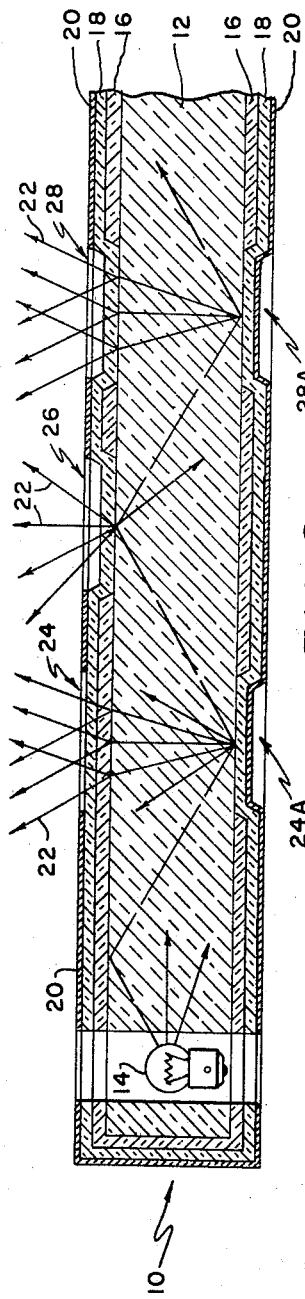

Reference is now made to FIGURE 2B which may be assumed to include the light salvaging techniques defined in the description of and shown in FIGURE 2A.

As shown in FIGURE 2B, light rays 22 from the source 14 can selectively be transmitted out of the core 12 through the translucent white coating 18 in first, second, and third representative areas 24, 26 and 28 on the obverse surface of the panel 10.

This can be accomplished in several ways, both of which require that the opaque coating 20 be selectively removed from the areas 24, 26 and 28 on the obverse surface of the panel 10.

For example, the first area 24 is covered by both the translucent white coating 18 and the transparent isolating coating 16 on the core 12. However, directly opposite this first area 24 is a substantially equal or greater area 24A in which the isolating coating 16 has been replaced by the translucent coating 18 or some other diffuse or conventionally reflective material, often referred to in the prior art as a "light patch." This causes reflection of incident light from the area 24A toward the area 24 at less than the critical angle of incidence for the interface of the isolating coating 16 and core 12 and therefore, light is transmitted through the said isolating coating 16 and the translucent coating 18 to the obverse face of the panel 10.

Alternatively, the second area 26 may be adapted for light transmittance by removing the transparent isolating coating 16 and permitting the translucent white coating 18 to contact the surface of the core 12. This forms a diffuse interface with the core 12 over the second area 26 which transmits a substantial portion of the incident light thereon to the obverse surface of the panel 10.

Further, with reference to the third area 28, an opposed area 28A, similar to the area 24A, may be provided and the area 28 defined in a similar manner to the second area 26, whereby suitable interfaces are created on both the obverse and rear surfaces of the core 12 to effect light transmission to the obverse surface of the panel 10.

Referring to FIGURE 3, the adaptability of the guided light panel 10 of the present invention to visual indicators of a condition responsive type will now be described.

As shown, obverse fourth and fifth transmittance areas 30 and 32 and respectively associated opposed rear surface areas 34 and 36 are provided on the panel 10. At least, the opaque coating 20 and translucent coating 18 (and, if desired, the isolating coating 16 also) are removed from the obverse areas 30 and 32 and all coatings are removed from the rear areas 34 and 36.

Adjacent the rear areas 34 and 36 is mounted a pressure responsive device 38 including a light-reflective displaceable membrane 40 defining one wall of a pressure chamber 42. The pressure chamber 42 is connected through a pressure coupling 44 to a source of pressure (not shown) which is to be monitored.

If a pressure increase is detected of sufficient magnitude to displace the membrane 40 into optical contact with the core 12 at the rear areas 34 and 36, defined thereon, the internal illumination or light rays 22 in the core 12 are reflected toward the obverse surface at less than the critical angle of incidence. Therefore, the light 22 is transmitted through the core 12 and thence through the obverse surface areas 30 and 32. Thus, a visual indication of a monitored physical condition is readily provided.

Referring now to FIGURE 4, a display panel means similar to that previously described with reference to FIGURE 2B is shown, with like numerals being affixed to those elements similar to those of FIGURE 2B.

In this embodiment, a light source is shown as comprising a modular structure 14A having a lamp 46 incased in a selectively colored transparent plastic housing 48 adapted for insertion into a conforming cavity 50 in the core 12 of the panel 10.

The modular source 14A can be one of several similar sources 14A conveniently mounted on a printed circuit board 52 with suitable conductive patterns 54 thereon as is well known in the art.

By insertion of source modules 14A in cavities 50 in the display panel 10 having a preselected color in the source housing 48, selective color effects can be had at the obverse areas 24 and 28. For example, a source having a white housing 48 can be selectively energized for "daylight" readout and a source having a red housing 48 can be selectively energized for "night" readout.

It should be noted that the obverse areas 24 and 28 and other similar obverse areas can be either mechanically or chemically treated to selectively remove or alter the various optical coatings thereon.

Alternative to the selected color effects in the modular sources 14A, or in combination therewith to provide selective illumination effects of obverse areas through complementary optical filtering, a filter layer coating 55 can be deposited on the obverse surface of the panel 10 intermediate the transparent isolating coating 16 and the white translucent coating 18. This permits the highly desirable use of selectively colored indicia while precluding the adverse effects of a core-to-filter interface, which would result in prohibitively high absorption losses and undesirable internal color mixing effects.

A special effect type of lighting, and an exemplary embodiment for situations requiring special geometrics are shown in FIGURES 5 and 6 which will now be described.

Referring to FIGURES 5 and 6, an instrument pointer 56 or the like is shown mounted on a suitable shaft 58 and bearing 60 for rotation over a dial 62 which may be of a conventional single panel type or a guided-light panel according to the present invention.

A selected portion of the obverse surface of the pointer 56 about the shaft 58 and adjacent edge portions are covered with a metal shield 64 or like opaque coating. The pointer 56 is comprised of a core 12A of material capable of being edge-lighted and is coated over its rear surface with a transparent isolating layer 16A.

Selective removal of the isolating layer 16A is effected by cutting a circular V-channel 66 in the rear surface of the pointer 56 which extends into the core 12A. This, or other suitable technique, provides the means for diffusing light into the core 12A from a suitable source or sources 14B mounted in the dial 62 about the pointer shaft 58 and bearing 60. Suitable annular light shielding means 68 is shown about the sources 14B.

Further selective removal of the isolating layer 16A is effected at areas desired to be illuminated for viewing from the obverse surface of the pointer 56. Transmission of light to the obverse surface from such selected areas is effected by utilizing light reflective coating such as the diffuse translucent white layer 18A deposited over the rear surface of the pointer 56 from a point adjacent the light shield 68 and permitting the said translucent layer 18A to contact and form a diffuse interface with the core 12A of the pointer 56 in those areas where the isolating layer 16A has been removed to effect obverse transmission of illumination.

As shown in FIGURES 5 and 6, the selected area 70 for obverse transmittance of illumination is pointed at the "point" or free end 72 of the pointer 56, although other positions for this effect can be selected.

Another embodiment of a display panel according to the present invention, providing selective and/or redundant illumination, is shown in FIGURE 7 as including substantially the panel structure of FIGURE 2B with multiple internal light sources 14C and 14D mounted adjacent the rear surface of the panel structure in the core 12 with an intermediate shielding plate 72 in the core 12 between the sources 14C–14D and the obverse panel surface.

Obverse readout areas 26 and 28 are shown which correspond to like numbered obverse areas in the embodiment of FIGURE 2B.

The intermediate shielding plate 72 comprises an opaque lamination 20A with transparent isolating layers 16B and 16C on the obverse and rear surfaces thereof, respectively.

To effect transmission of illumination by the obverse surface area 28, a light reflective "patch" 28B may be superimposed on or selectively substituted for the obverse isolating layer 16B on the intermediate shielding plate 72. Alternatively, the obverse transmission of illumination may be effected through the obverse area 26 as previously described herein with reference to the embodiment of FIGURE 2B.

The embodiment of FIGURE 7 provides the practical advantages of reflux type panel illumination in opaque-faced edge-lighted single panel structures. Heretofore, these advantages have not been attainable in such structures.

If a rectangular plan view of the embodiment of FIGURE 7 is considered for the sake of example, light from beneath the shield plate 72 is efficiently conveyed to the upper portion of the core 12 above the said shield plate 72 and the "light rays" 22 recirculate and criss-cross within the said upper portion. Of course, it is to be understood that all of the means previously discussed herein for the embodiments of FIGURES 1, 2A, 2B, 3 and 4 for conserving and constraining the behavior of the internal illumination of the core 12 are inherent in and/or can readily be incorporated in the embodiment of FIGURE 7.

Figure 8:
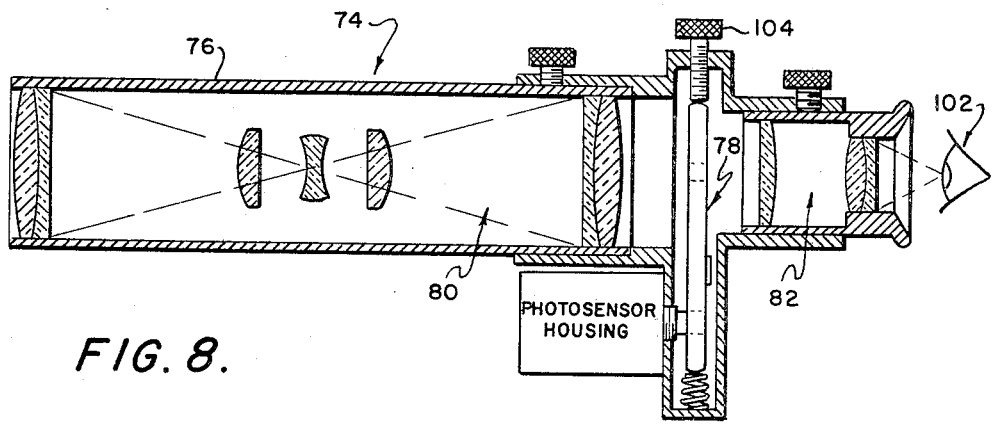
FIGURE 8 is a schematic, in partial cross-section, of an optical detector incorporating a light guiding means of the present invention.
Figure 9:
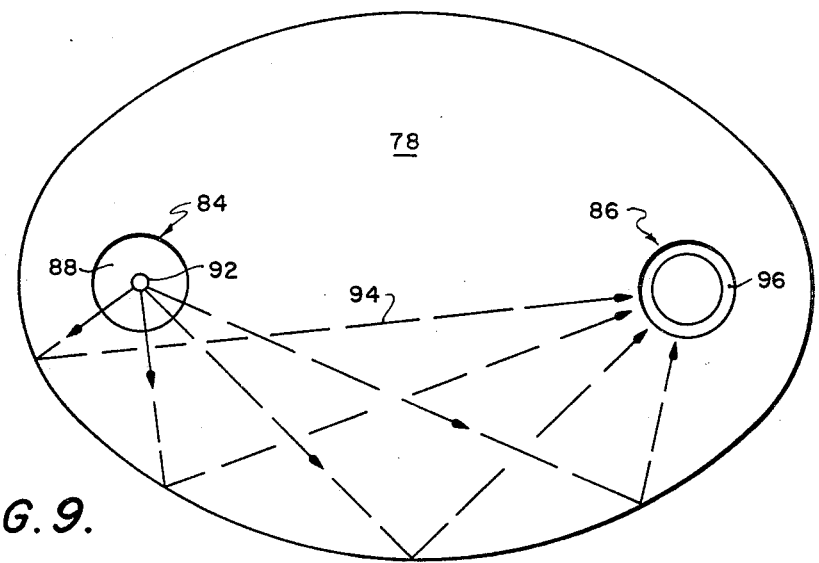
FIGURE 9 is an enlarged top plan schematic of a preferred embodiment of the light guiding means of FIGURE 8.
Figure 10:
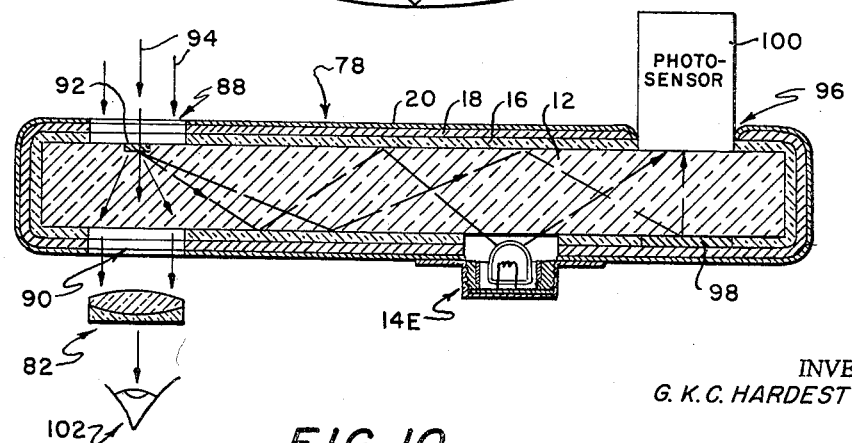
FIGURE 10 is a side elevation, in cross-section, of a light guiding means of the type schematically shown in FIGURES 8 and 9.

Referring now to FIGURES 8, 9 and 10, the versatility of the present invention is exemplified in an optical detector means 74 generally comprising a telescope 76 with a guided-light panel device 78 mounted intermediate the objective optics 80 and ocular optics 82 thereof at the position normally occupied by a reticle.

The panel device 78 is elliptical in plan view to effect optimum reflected transmission of internal illumination from one of the foci 84 of the ellipse to the other of the foci 86 thereof.

The guided-light device 78 has all of the coatings 16–18–20 removed from both the incident and rear faces thereof over predetermined incident and obverse areas 88 and 90, respectively, which are in registry. A diffusive translucent "patch" 92 is embedded in the core 12 of guided-light device 78 in the central part of the incident area 88, such that incident light 94 entering the core 12 is scattered into same as well as transmitted transversely therethrough to the obverse area 90. For increased efficiency in this embodiment, the translucent coating 18 can be replaced by a specular coating such as deposited aluminum.

Since the plan view of the guided light device is elliptical, light 94 scattered at one of the foci 84 is focused at the other of the foci 86 by the internally reflective properties of the transparent isolating layer 16 alone or in combination with other coatings as previously described herein.

A third area 96 is provided at the said other of the foci 86 on either the incident or obverse surfaces of the device 78 and is shown on the incident surface thereof.

A substantially coextensive "light patch" 98 is provided opposite the third area 96 at the boundary of the core 12 as previously defined herein, to direct illumination toward the said third area 96.

The third transmittance area 96 is in registry with a photo-sensor 100 optically coupled with the core 12; the isolating layer 16, the opaque layer 20 and translucent or specular layer 18 having been removed to define the said third area.

Thus, the presence of illumination at the incident area 88 will be transmitted as an image to the eye 102 of an observer through the core 12 and ocular 82 and simultaneously, a portion thereof will be transmitted to the photo-sensor 100 through the core 12 by the diffusing and scattering action of the diffuse patch 92. It will suffice to state at this point that the size of the diffuse patch 92 is similar to the use of a translucent "dot" at the cross-point of a conventional cross-hair reticle.

Proper centering of the diffuse patch 92 in the telescope 76 is facilitated by the optional use of a light source 14E in the obverse surface of the guided-light device 78. This provides selective illumination of the diffuse patch 92 whereby it may be viewed through the ocular 82 and an adjustment such as by the positioning screw 104 (FIGURE 8) can be effected.

Further, selective differential detection of light levels can be made with this embodiment if the source 14E is utilized as a standard to bias the photo-sensor 100.

As can be readily seen from the foregoing specification and drawings, this invention provides new and novel means for achieving unprecedented collective optimization of the qualities of simplicity of structure, efficiency of light utilization, power levels of energization, uniformity of illumination of indicia and the like and consumption of space in opaque-faced display panels, light guides and other related devices.

Further, this invention provides a new and novel light guide structure effecting true "total internal reflection" for a substantial portion of the light from any given source embedded therein with the capability of selectively transmitting part of the internal illumination through the obverse surface thereof. The selective transmittance of light through the obverse surface of such structures is readily adapted to both static and dynamic display or readout devices.

Without further description it is believed that the advantages of the present invention over the prior art is apparent and while several preferred embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. Transducer means intercepting a representative portion of a collimated light input and providing an indication of its presence comprising: light guide means comprised of a core of transparent sheet material of a predetermined plan configuration having a characteristic first index of refraction, a transparent lamination over said core forming an interface therewith and having a characteristic second index of refraction which is of lesser magnitude than said first index, a specular lamination over said transparent lamination forming an interface therewith, and an opaque lamination over said specular lamination forming an interface therewith; first and second surface areas on respectively opposite surfaces of said core, said first and second areas being in registry and having all said laminations removed therefrom thereby being adapted to transmit collimated light through said core; an insert of light diffusing material in said core in alignment with said first and second surface areas, said insert covering an area relatively small compared to that of said first and second areas; a third surface area on said core displaced from said first and second areas from which all said laminations are removed; and photoresponsive detector means optically coupled with said core at said third area; said diffusing material acting on collimated light transmitted through said first and second areas to scatter a representative portion of same into said core whereby light is transmitted through said core and through said third surface area to said photodetector means.

2. The invention defined in claim 1, wherein a fourth surface area is provided on said core of transparent sheet material, displaced from said first and second areas, in substantial registry with and on an opposite surface of said core from said third area; and wherein over said fourth area said transparent lamination is removed and a diffuse lamination is provided thereover forming an interface with said core and said specular lamination, said diffuse lamination effecting enhanced transmission of light from within said core through said third area.

3. The invention defined in claim 1, wherein said predetermined plan configuration of said transparent sheet material is a plane ellipse; wherein said first and second surface areas are located at one of the foci of said ellipse; and wherein said third surface area is located at the other of the foci of said ellipse.

4. The invention defined in claim 2, wherein the plan configuration of said core of transparent sheet is a plane ellipse; wherein said first and second areas on said core are located at one of the foci of said ellipse; and wherein said third and fourth areas on said core are located at the other of the foci of said ellipse.

5. The invention defined in claim 2, wherein said transducer means further comprises optical telescope means, said light guide means being mounted in the focal plane of said telescope means with said first and second surface areas and said insert of light diffusing material in alignment with the optical path of said telescope means and said third surface area out of alignment therewith.

6. The invention defined in claim 5, wherein said transducer means further includes a source of internal illumination in said light guide means.

7. Guided-light illuminated display panel means comprising a core of transparent sheet material having a characteristic first index of refraction; source means of illumination contained within said core propagating light therethrough between the obverse and rear surfaces thereof; a transparent lamination over said core, forming an interface therewith, having a characteristic second index of refraction of lesser magnitude than said first index and being of a sufficient thickness to totally internally reflect light from said source within a given range of incident angles thereto as determined by the relative magnitudes of said first and second indices of refraction; a translucent lamination over said transparent lamination and forming an interface therewith; and an opaque lamination over said translucent lamination and forming an interface therewith; one or more of said laminations being selectively removed from preselected areas on said obverse and rear surfaces of said core to permit selective transmission of light through said preselected areas on the said obverse surface transverse to the direction of propagation of light from said source.

8. The invention defined in claim 7, wherein at selected ones of said areas said transparent lamination is removed and said translucent lamination forms a diffuse interface with said core.

9. The invention defined in claim 7, wherein at selected ones of said areas said translucent and opaque laminations are removed.

10. The invention defined in claim 7, wherein selected ones of said areas are substantially in registry on said obverse and rear surfaces of said core; of which, at said obverse surface areas, said opaque lamination is removed and at said rear surface areas, said transparent lamination is removed and said translucent lamination forms a diffuse interface with said core.

11. The invention defined in claim 7, wherein selected ones of said areas are substantially in registry on said obverse and rear surfaces of said core; wherein at least the opaque lamination is removed from said selected ones of said obverse areas; and wherein all of said laminations are removed from said selected ones of said rear areas to expose and adapt said core to be selectively engaged by means effecting a diffuse interface therewith, thereby selectively providing for the transmission of light from said core through said selected ones of said obverse areas in response to an engagement of said means with said core.

12. The invention defined in claim 7, wherein said display panel means further includes optical filter lamination means intermediate and forming interfaces with said transparent and translucent laminations, said filter lamination means being selectively removable from selected ones of said preselected areas.

13. The invention defined in claim 7, wherein said display panel means further includes optical filter lamination means intermediate and forming interfaces with said transparent and translucent laminations, said filter lamination means being selectively removable from selected ones of said preselected areas; and wherein said source means comprises a plurality of selectively energizable light sources of preselected spectral characteristics.

14. The invention defined in claim 7, wherein said source means comprises a plurality of selectively energizable light sources of preselected spectral characteristics.

15. In a light guide structure, means effecting total internal reflection of light within a given range of incident angles comprising the combination of a core of transparent material having a characteristic first index of refraction and a transparent lamination over said core forming an interface therewith, said transparent lamination having a characteristic second index of refraction which is of lesser magnitude than said first index and being of sufficient thickness to effect total internal reflection in said light guide of light within a given range of incident angles as determined by the relative magnitudes of said indices of refraction and wherein said core is a sheet of transparent material, wherein over first, second and third preselected surface areas of said core said transparent lamination is removed; and which further includes a specular lamination coextensive over and forming an interface with said transparent lamination, an opaque lamination coextensive over and forming an interface with said specular lamination, said first and second preselected areas being in substantial registry on opposite surfaces of said core, and an insert of light diffusing material in said core in alignment with said first and second preselected areas, said insert covering an area relatively small compared to that of said preselected areas.

16. The invention defined in claim 15, wherein said transparent coating is removed from a fourth preselected area in registry with said third preselected area on opposite surfaces of said sheet comprising said core, and wherein said fourth area is covered with a diffuse lamination forming an interface with said core, said specular lamination forming an interface with said diffuse lamination and said opaque lamination forming an interface with said specular lamination.

17. The invention defined in claim 15, wherein said sheet of transparent material is in the shape of a plane ellipse and wherein said first and second preselected areas are located on opposed plane surfaces of said sheet at one of the foci of said ellipse and said third area is located on a plane of said sheet at the other of the foci of said ellipse.

18. The invention defined in claim 15, wherein said transparent coating is removed from a fourth preselected area in registry with said third preselected area on opposite surfaces of said sheet comprising said core, and wherein said fourth area is covered with a diffuse lamination forming an interface with said core, said specular lamination forming an interface with said diffuse lamination and said opaque lamination forming an interface with said specular lamination; further wherein said sheet of transparent material is in the shape of a plane ellipse; wherein said first and second preselected areas are located on opposed plane surfaces of said sheet at one of the foci of said ellipse; and wherein said third and fourth preselected areas are located on opposed plane surfaces of said sheet at the other of the foci of said ellipse.

19. In light guide structure, means effecting total internal reflection of light within a given range of incident angles comprising the combination of a core of transparent material having a characteristic first index of refraction, a transparent lamination over said core forming an interface therewith, said transparent lamination having a characteristic second index of refraction which is of lesser magnitude than said first index and being of sufficient thickness to effect total internal reflection in said light guide of light within a given range of incident angles as determined by the relative magnitudes of said indices of refraction, a translucent lamination over said transparent lamination forming an interface therewith, and an opaque lamination over said translucent lamination forming an interface therewith.

20. The invention defined in claim 19, wherein said transparent lamination substantially totally encloses said core.

21. The invention defined in claim 19, wherein said transparent lamination is coextensive with a preselected surface area of said core.

22. The combination of claim 19, wherein over preselected areas of said core, said transparent and opaque laminations are removed and said translucent lamination forms an interface with said core over selected ones of said preselected areas and elsewhere with said transparent coating.

23. The invention defined in claim 22, wherein selected ones of said preselected areas are substantially in registry on opposite faces of said core.

24. The combination of claim 22, wherein over other preselected areas of said core, only said transparent lamination is removed and said translucent lamination forms an interface with said core over selected ones of said preselected areas and elsewhere with said transparent coating.

References Cited
UNITED STATES PATENTS

| | | | |
|---|---|---|---|
| 1,816,220 | 7/1931 | Hotchner | 40—130 |
| 2,595,973 | 5/1952 | Neugass | 40—130 |
| 2,772,498 | 12/1956 | Miles | 40—130 |
| 2,831,282 | 4/1958 | Hardesty | 40—130 |
| 2,831,453 | 4/1958 | Hardesty | 40—130 X |
| 2,812,607 | 11/1957 | Briggs | 40—130 |
| 2,992,587 | 7/1961 | Hicks | 350—96 |
| 3,051,038 | 8/1962 | Duke | 350—96 |
| 3,403,955 | 10/1968 | Jueneman | 350—96 |

JAMES W. LAWRENCE, Primary Examiner

D. O'REILLY, Assistant Examiner

U.S. Cl. X.R.

40—130; 240—1; 350—96